(12) United States Patent
Wu

(10) Patent No.: US 11,119,362 B1
(45) Date of Patent: Sep. 14, 2021

(54) DISPLAY PANEL MANUFACTURING PROCESS AND DISPLAY PANEL

(71) Applicants: HKC Corporation Limited, Shenzhen (CN); Chongqing HKC Optoelectronics Technology Co., Ltd., Chongqing (CN)

(72) Inventor: Chuan Wu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 473 days.

(21) Appl. No.: 16/313,885

(22) PCT Filed: Nov. 13, 2018

(86) PCT No.: PCT/CN2018/115208
§ 371 (c)(1),
(2) Date: Dec. 28, 2018

(87) PCT Pub. No.: WO2020/073415
PCT Pub. Date: Apr. 16, 2020

(30) Foreign Application Priority Data

Oct. 10, 2018 (CN) .......................... 201811179579.7

(51) Int. Cl.
*G02F 1/1339* (2006.01)
*G02F 1/1343* (2006.01)

(52) U.S. Cl.
CPC ........ *G02F 1/1339* (2013.01); *G02F 1/13439* (2013.01); *G02F 1/134309* (2013.01)

(58) Field of Classification Search
None
See application file for complete search history.

(56) References Cited

U.S. PATENT DOCUMENTS

| | | | |
|---|---|---|---|
| 2010/0045912 A1* | 2/2010 | Chen ................... | G02F 1/13394 349/122 |
| 2011/0090445 A1* | 4/2011 | Kim ...................... | G02F 1/1339 349/139 |

(Continued)

FOREIGN PATENT DOCUMENTS

| | | |
|---|---|---|
| CN | 101699335 A | 4/2010 |
| CN | 102354069 A | 2/2012 |

(Continued)

OTHER PUBLICATIONS

International Search Report issued in corresponding International application No. PCT/CN2018/115208, dated Jul. 12, 2019(7 pages).

(Continued)

*Primary Examiner* — Ryan Crockett

(57) ABSTRACT

This application discloses a display panel manufacturing process and a display panel. The manufacturing process includes: forming a common line, a common electrode and a transparent electrode layer, the transparent electrode layer being in communication with the common line; and arranging an Au ball on the transparent electrode layer, and enabling the Au ball to communicate the transparent electrodes layer with the common electrode.

19 Claims, 5 Drawing Sheets

(56) References Cited

U.S. PATENT DOCUMENTS

| | | | | |
|---|---|---|---|---|
| 2011/0194062 A1* | 8/2011 | Lee | ....................... | G02F 1/1339 349/149 |
| 2013/0148061 A1* | 6/2013 | Wang | ................ | G02F 1/134309 349/106 |
| 2016/0154287 A1* | 6/2016 | Lee | ....................... | G02F 1/1345 349/43 |
| 2017/0017109 A1* | 1/2017 | Park | .................... | G02F 1/13394 |
| 2017/0097533 A1* | 4/2017 | Park | ....................... | G02F 1/1337 |
| 2018/0188867 A1* | 7/2018 | Yeh | ......................... | G06F 3/047 |

FOREIGN PATENT DOCUMENTS

| | | | |
|---|---|---|---|
| CN | 102645790 | A | 8/2012 |
| CN | 102650776 | A | 8/2012 |
| CN | 102830550 | A | 12/2012 |
| CN | 203287657 | U | 11/2013 |
| CN | 104216189 | A | 12/2014 |
| CN | 104317125 | A | 1/2015 |
| CN | 104777650 | A | 7/2015 |
| CN | 107024809 | A | 8/2017 |
| CN | 108255354 | A | 7/2018 |
| JP | 2003029275 | A | 1/2003 |
| JP | 2003066465 | A | 3/2003 |
| JP | 2004053815 | A | 2/2004 |
| JP | 2004294799 | A | 10/2004 |
| JP | 2007219235 | A | 8/2007 |
| JP | 2008070652 | A | 3/2008 |
| KR | 20070003165 | A | 1/2007 |

OTHER PUBLICATIONS

First Office Action from China patent office in a counterpart Chinese patent Application 201811179579.7, dated Apr. 3, 2020 (7 pages).
Written Opinion of the International Searching Authority for No. PCT/CN2018/115208.

* cited by examiner

DISPLAY PANEL MANUFACTURING PROCESS AND DISPLAY PANEL

This application claims priority to Chinese Patent Application No. CN201811179579.7, filed with the Chinese Patent Office on Oct. 10, 2018 and entitled "DISPLAY PANEL MANUFACTURING PROCESS AND DISPLAY PANEL", which is incorporated herein by reference in its entirety.

TECHNICAL FIELD

This application relates to the field of display technologies, and in particular, to a display panel manufacturing process and a display panel.

BACKGROUND

Statement herein merely provides background information related to this application and does not necessarily constitute the existing technology.

Contributing to many advantages such as thinness, power saving, and no radiation, liquid crystal displays are widely applied. Most of liquid crystal displays on the market are backlight-type liquid crystal displays, including liquid crystal panels and backlight modules. A working principle of a liquid crystal panel is placing liquid crystal molecules between two parallel substrates and applying a drive voltage to the two glass substrates to control rotation directions of the liquid crystal molecules, to refract light of the backlight module to generate a picture.

In a liquid crystal display (LCD) of the vertical alignment (VA) technology, liquid crystals are rotated by a vertical electric field loaded and formed between a color filter substrate and an array substrate, so that the liquid crystals form different deflection angles, and thereby, upper polarizer can transmit light of different intensities. During the electric field loading process, the electric field on the color filter substrate transfers a signal from the array substrate to the color filter substrate by a transfer pad. A coil of mesh common metal electrode of a first metal layer and a second metal layer is usually arranged around the periphery of the panel, and a transfer pad is designed at a suitable position. The transfer pad is positioned on the first metal layer or a transparent electrode layer is laid on the first metal layer and the second metal layer to form a transfer pad. During the actual working process of the panel, a common electrode signal transmitted by the first metal layer is transferred, in the transfer pad region, through the first metal layer via an Au ball to a common electrode of the color filter substrate, and transmitted from the array substrate to the color filter substrate.

A transfer pad is formed in a sealant region beside a visible area (AA area) on the array substrate side, and then an Au ball is sprinkled in the liquid crystal cell manufacturing stage to form an electrical connection between a pixel electrode and a common electrode. However, when the sealant and the Au ball are coated, a display abnormality may occur.

SUMMARY

An objective of this application is to provide a display panel manufacturing process and a display panel to resolve the display abnormality of the display panel.

To achieve the foregoing objective, this application provides a display panel manufacturing process, comprising the steps of:

covering a substrate with a metal material layer to form a first metal layer located in a non-display area and a common line located in a display area;

forming a gate insulating layer on a first surface of the first metal layer, and etching off a portion of the gate insulating layer corresponding to a transfer pad to form a gate insulating recessed region;

forming a second metal layer on a first surface of the gate insulating layer, and etching off a portion of the second metal layer corresponding to the gate insulating recessed region to form a second metal recessed region;

forming a passivation layer on a first surface of the second metal layer, and etching off a portion of the passivation layer corresponding to the transfer pad to form a passivation recessed region, the width of the passivation recessed region being greater than the width of the second metal recessed region, and an exposed surface of the second metal layer being a second metal transfer pad;

forming a transparent electrode layer on the first surface of the second metal layer such that the transparent electrode layer covers the second metal transfer pad and the transparent electrode layer is in communication with the common line through the second metal transfer pad, to form a first substrate;

forming a second substrate provided with a common electrode; and arranging an Au ball on a first surface of the transparent electrode layer, and enabling the Au ball to communicate the transparent electrode layer of the first substrate with the common electrode of the second substrate.

Optionally, the step of forming a transparent electrode layer on the first surface of the second metal layer such that the transparent electrode layer covers the second metal transfer pad and the transparent electrode layer is in communication with the common line through the second metal transfer pad comprises:

covering the surface of the first surface of the first metal layer corresponding to the transfer pad, side walls of the gate insulating layer and the second metal layer corresponding to the second metal recessed region, and the second metal transfer pad with the formed transparent electrode layer.

Optionally, the step of forming a transparent electrode layer on the first surface of the second metal layer such that the transparent electrode layer covers the second metal transfer pad and the transparent electrode layer is in communication with the common line through the second metal transfer pad comprises:

partially etching off a portion of the first metal layer corresponding to the transfer pad to form a first metal recessed region; and covering the first metal recessed region, side walls of the gate insulating layer and the second metal layer corresponding to the second metal recessed region, and the second metal transfer pad with the formed transparent electrode layer.

Optionally, the first metal layer and the common line of the first substrate are formed by the same manufacturing process and are electrically connected to each other.

Optionally, the second metal layer and the common line of the second substrate are formed by the same manufacturing process and are electrically connected to each other.

Optionally, the common line of the first substrate and the first metal layer or the second metal layer are made through a same mask, and the first metal layer and the second metal layer are electrically connected through a via hole.

This application further discloses a display panel, comprising:

a first substrate;

a second substrate, arranged opposite to the first substrate, wherein the first substrate comprises a common line, and the second substrate comprises a common electrode; and an Au ball, arranged in a non-display area of the display panel, and conducting the common line of the first substrate and the common electrode of the second substrate, the Au ball being positioned at a transfer pad, wherein the first substrate comprises:

a substrate;

a first metal layer, arranged on the substrate;

a gate insulating layer, arranged on a first surface of the first metal layer, and hollowed out corresponding to the transfer pad to form a gate insulating recessed region;

a second metal layer, arranged on a first surface of the gate insulating layer, a portion of the second metal layer corresponding to the gate insulating recessed region being hollowed out to form a second metal recessed region;

a passivation layer, arranged on a first surface of the second metal layer, a portion of the passivation layer corresponding to the gate insulating recessed region being hollowed out to form a passivation recessed region, the width of the passivation recessed region being greater than the width of the second metal recessed region, and an exposed surface of the second metal layer being a second metal transfer pad; and a transparent electrode layer, covering the second metal transfer pad, the transparent electrode layer being in communication with the common line of the first substrate, wherein the Au ball is arranged at a position of the transparent electrode layer corresponding to the second metal recessed region, and communicates the transparent electrode layer of the first substrate with the common electrode of the second substrate.

Optionally, the transparent electrode layer covers the second metal transfer pad, and meanwhile, covers the surface of the first metal layer, and side walls of sides of the gate insulating layer and the second metal layer corresponding to the second metal recessed region.

Optionally, the first metal recessed region is located at a hollowed portion of the first metal layer corresponding to the transfer pad; and the transparent electrode layer covers the first metal recessed region, side walls of sides of the gate insulating layer and the second metal layer corresponding to the second metal recessed region, and the second metal transfer pad.

This application further discloses a display device, comprising the foregoing display panel.

In an LCD of the vertical alignment (VA) technology, liquid crystals are rotated by a vertical electric field loaded and formed between a first substrate and a second substrate, so that the liquid crystals form different deflection angles, and thereby, the upper polarizer can transmit light of different intensities. During the electric field loading process, in order to make the common line on the first substrate and the common electrode of the second substrate conductive to each other, a conductive transfer pad needs to be arranged in the sealant of the first substrate, so that the Au ball contacts the upper and lower substrates; and at the position where no Au ball is arranged, it is possible not to arrange the transfer pad. In the transfer pad of the first substrate, the transparent electrode layer in communication with the common line is laid; and in the position where the transfer pad is not arranged, the common line can be hollowed out to form a mesh to facilitate light curing on the sealant. In such the solution, after cell alignment, when the Au ball and the sealant are coated, if the Au ball is pressed to protrude from the transfer pad, the upper and lower substrates are not well-conducted, or the thickness of the cell is abnormal, causing display abnormality. In this solution, the transparent electrode layer covers the second metal transfer pad, the transparent electrode layer is in communication with the common line through the second metal transfer pad, and the Au ball is arranged on the first surface of the transparent electrode layer, so that the Au ball communicates the transparent electrode layer of the first substrate with the common electrode of the second substrate, to finally implement the mutual conduction between the common line of the first substrate and the common electrode of the second substrate. In this way, since the second metal transfer pad increases the overall width of the transfer pad, the coated sealant is prevented from overflowing from the transfer pad, thereby improving the display quality.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION

Figure 1:
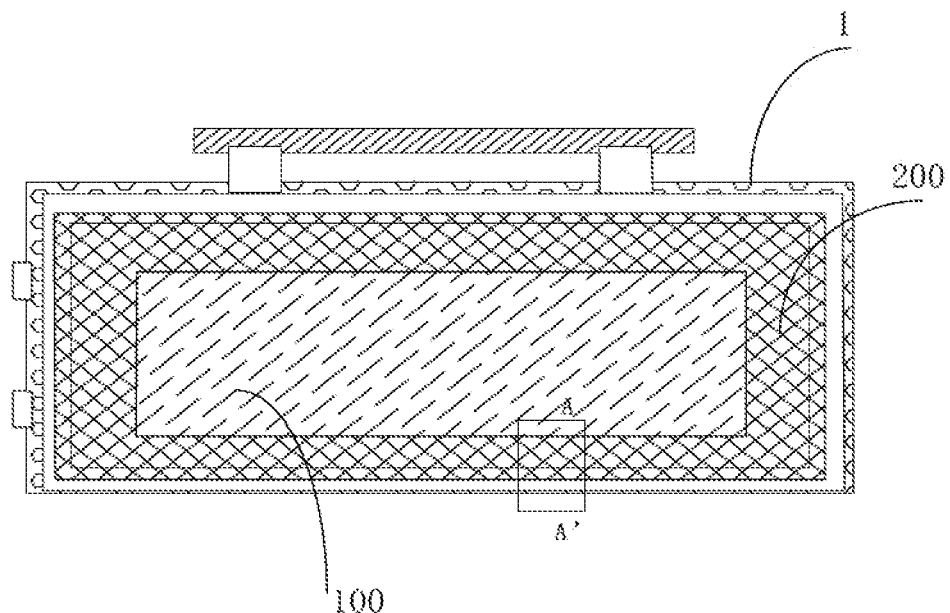
FIG. 1 is a schematic view of the basic structure of a display panel according to an embodiment of this application.
Figure 2:
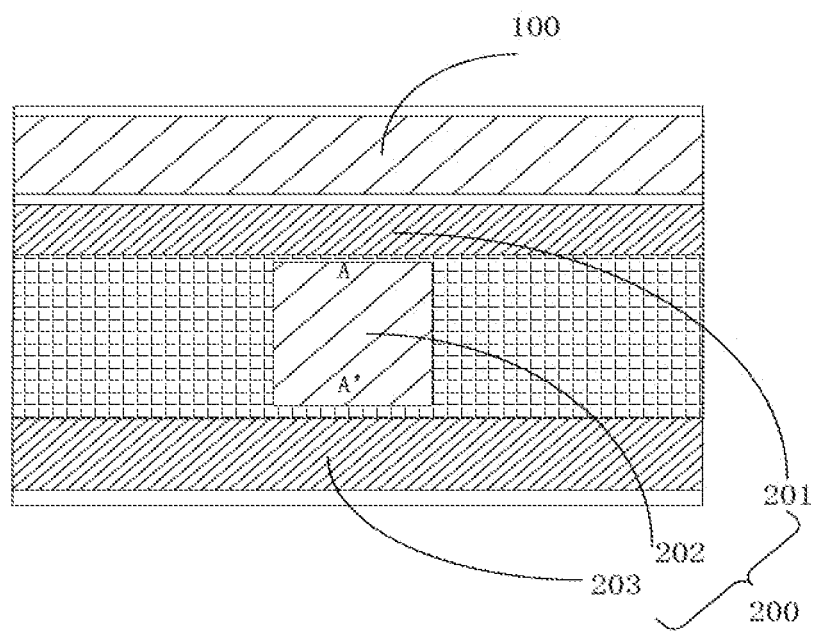
FIG. 2 is an enlarged schematic view of the A-A' area in FIG. 1.
Figure 3:
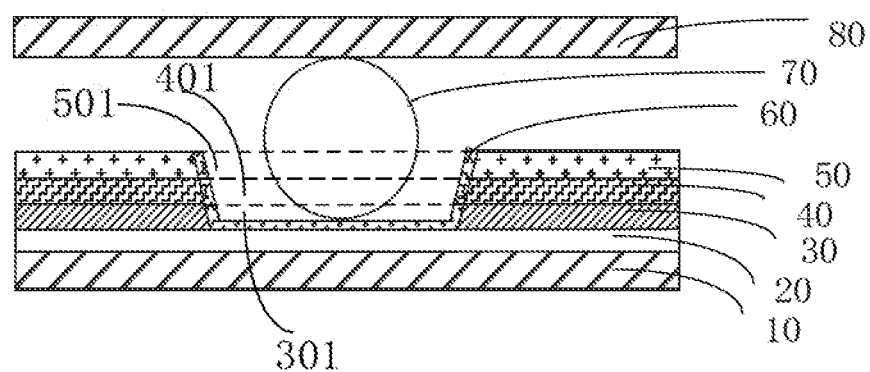
FIG. 3 is a cross-sectional schematic view of the A-A' area in FIG. 1.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly includes one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

A first surface corresponds to, for example, an upper surface.

This application is further described below with reference to the accompanying drawings and optional embodiments.

As shown in FIG. 1 to FIG. 8, in an embodiment, this application discloses a display panel manufacturing process, including the steps of:

covering a substrate 10 with a metal material layer to form a first metal layer 20 located in a non-display area 200 and a common line located in a display area 100;

forming a gate insulating layer 30 on a first surface of the first metal layer 20, and etching off a portion of the gate insulating layer 30 corresponding to a transfer pad 202 to form a gate insulating recessed region 301;

forming a second metal layer 40 on a first surface of the gate insulating layer 30, and etching off a portion of the second metal layer 40 corresponding to the gate insulating recessed region 301 to form a second metal recessed region 401;

forming a passivation layer 50 on a first surface of the second metal layer 40, and etching off a portion of the passivation layer 50 corresponding to the transfer pad 202 to form a passivation recessed region 501, the width of the passivation recessed region 501 being greater than the width of the second metal recessed region 401, and an exposed surface of the second metal layer 40 being a second metal transfer pad 90;

forming a transparent electrode layer 60 on the first surface of the second metal layer 40 such that the transparent electrode layer 60 covers the second metal transfer pad 90 and the transparent electrode layer 60 is in communication with the common line through the second metal transfer pad 90, to form a first substrate;

forming a second substrate 80 provided with a common electrode; and arranging an Au ball 70 on a first surface of the transparent electrode layer 60, and enabling the Au ball 70 to communicate the transparent electrode layer 60 of the first substrate with the common electrode of the second substrate 80.

The first substrate is an array substrate, and the second substrate 80 is a color filter substrate.

In an LCD of the vertical alignment (VA) technology, liquid crystals are rotated by a vertical electric field loaded and formed between the array substrate and the color filter substrate, so that the liquid crystals form different deflection angles, and thereby, the upper polarizer can transmit light of different intensities. During the electric field loading process, in order to make the common line on the array substrate and the common electrode of the color filter substrate conductive to each other, a conductive transfer pad 202 needs to be arranged in the sealant of the array substrate, so that the Au ball 70 contacts the upper and lower substrates; and at the position where no Au ball 70 is arranged, it is possible not to arrange the transfer pad 202. In the transfer pad 202 of the array substrate, the transparent electrode layer 60 in communication with the common line is laid; and in the position where the transfer pad 202 is not arranged, the common line can be hollowed out to form a mesh to facilitate light curing on the sealant. In such the solution, after cell alignment, when the Au ball 70 and the sealant are coated, if the Au ball 70 is pressed to protrude from the transfer pad 202, the upper and lower substrates are not well-conducted, or the thickness of the cell is abnormal, causing display abnormality. In this solution, the transparent electrode layer 60 covers the second metal transfer pad 90, the transparent electrode layer 60 is in communication with the common line through the second metal transfer pad 90, and the Au ball 70 is arranged on the first surface of the transparent electrode layer 60, so that the Au ball 70 communicates the transparent electrode layer 60 of the array substrate with the common electrode of the color filter substrate, to finally implement the mutual conduction between the common line of the array substrate and the common electrode of the color filter substrate. In this way, since the second metal transfer pad 90 increases the overall width of the transfer pad 202, the coated sealant can be prevented from overflowing from the transfer pad 202, thereby improving the display quality.

The substrate 10 may be a glass substrate.

In an embodiment, the step of forming a transparent electrode layer 60 on the first surface of the second metal layer 40 such that the transparent electrode layer 60 covers the second metal transfer pad 90 and the transparent electrode layer 60 is in communication with the common line through the second metal transfer pad 90 includes:

covering the surface of the first surface of the first metal layer 20 corresponding to the transfer pad 202, side walls of the gate insulating layer 30 and the second metal layer 40 corresponding to the second metal recessed region 401, and the second metal transfer pad 90 with the formed transparent electrode layer 60.

In this solution, the formed transparent electrode layer 60 covers the surface of the first surface of the first metal layer 20 corresponding to the transfer pad 202, and the transparent electrode layer 60 is in direct contact with the first metal layer 20, so that the conductivity is high.

Figure 4:
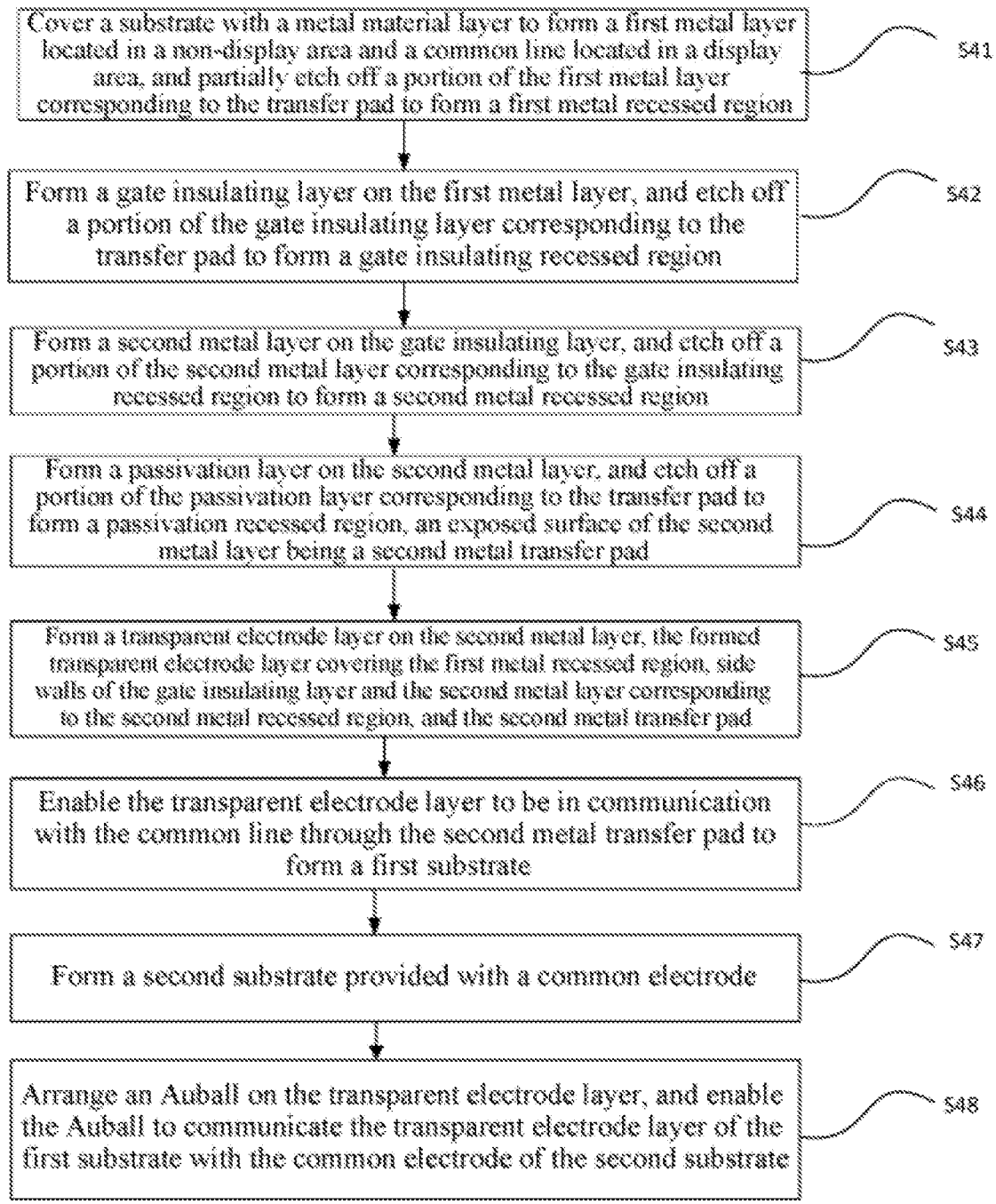
FIG. 4 is a schematic diagram of a display panel manufacturing process according to an embodiment of this application.

As an embodiment of this application, with reference to FIG. 4, a display panel 2 manufacturing process is disclosed, including the steps of:

S41: covering a substrate 10 with a metal material layer to form a first metal layer 20 located in a non-display area 200 and a common line located in a display area 100, and partially etching off a portion of the first metal layer 20 corresponding to the transfer pad 202 to form a first metal recessed region 201;

S42: forming a gate insulating layer 30 on a first surface of the first metal layer 20, and etching off a portion of the gate insulating layer 30 corresponding to the transfer pad 202 to form a gate insulating recessed region 301;

S43: forming a second metal layer 40 on a first surface of the gate insulating layer 30, and etching off a portion of the second metal layer 40 corresponding to the gate insulating recessed region 301 to form a second metal recessed region 401;

S44: forming a passivation layer 50 on a first surface of the second metal layer 40, and etching off a portion of the passivation layer 50 corresponding to the transfer pad 202 to form a passivation recessed region 501, the width of the passivation recessed region 501 being greater than the width of the second metal recessed region 401, and an exposed surface of the second metal layer 40 being a second metal transfer pad 90;

S45: forming a transparent electrode layer 60 on a first surface of the second metal layer 40, the formed transparent electrode layer 60 covering the first metal recessed region 201, side walls of the gate insulating layer 30 and the second metal layer 40 corresponding to the second metal recessed region 401, and the second metal transfer pad 90;

S46: enabling the transparent electrode layer 60 to be in communication with the common line through the second metal transfer pad 90 to form a first substrate;

S47: forming a second substrate 80 provided with a common electrode; and

S48: arranging an Au ball 70 on a first surface of the transparent electrode layer 60, and enabling the Au ball 70 to communicate the transparent electrode layer 60 of the first substrate with the common electrode of the second substrate 80.

In this solution, the portion of the first metal layer 20 corresponding to the transfer pad 202 is partially etched off to form the first metal recessed region 201, the formed transparent electrode layer 60 covers the first metal recessed region 201, and meanwhile, covers the side walls of the gate insulating layer 30 and the second metal layer 40 corresponding to the second metal recessed region 401, and the second metal transfer pad 90, and thus, the depth of the transfer pad 202 is increased, so that the coated sealant can be prevented from overflowing from the transfer pad 202, thereby improving the display quality.

In an embodiment, the first metal layer 20 and the common line of the first substrate are formed by the same manufacturing process and are electrically connected to each other.

In this solution, the first substrate is an array substrate, and the first metal layer 20 and the common line of the array substrate are formed by the same manufacturing process, so that the electrode can be connected without punching, thereby reducing the manufacturing process.

In an embodiment, the second metal layer 40 and the common line of the second substrate are formed by the same manufacturing process and are electrically connected to each other.

In this solution, the first substrate is an array substrate, and the second metal layer 40 and the common line of the array substrate are formed by the same manufacturing process, so that the electrode can be connected without punching, thereby reducing the manufacturing process.

In an embodiment, the common line of the first substrate and the first metal layer 20 or second metal layer 40 are made through a same mask, and the first metal layer 20 and the second metal layer 40 are electrically connected through a via hole.

In this solution, the first substrate is an array substrate, and the first metal layer 20 and the second metal layer 40 are electrically connected through a via hole, thereby reducing the possibility of an open circuit caused by disconnection. When the first common electrode of the array substrate is in the same layer and electrically connected to the first metal layer 20, the second metal layer 40 is insulated from the second metal layer 40 of the display area 100; and when the first common electrode of the array substrate is in the same layer and electrically connected to the second metal layer 40, the first metal layer 20 is insulated from the first metal layer 20 of the display area 100, to prevent crosstalk.

Figure 5:
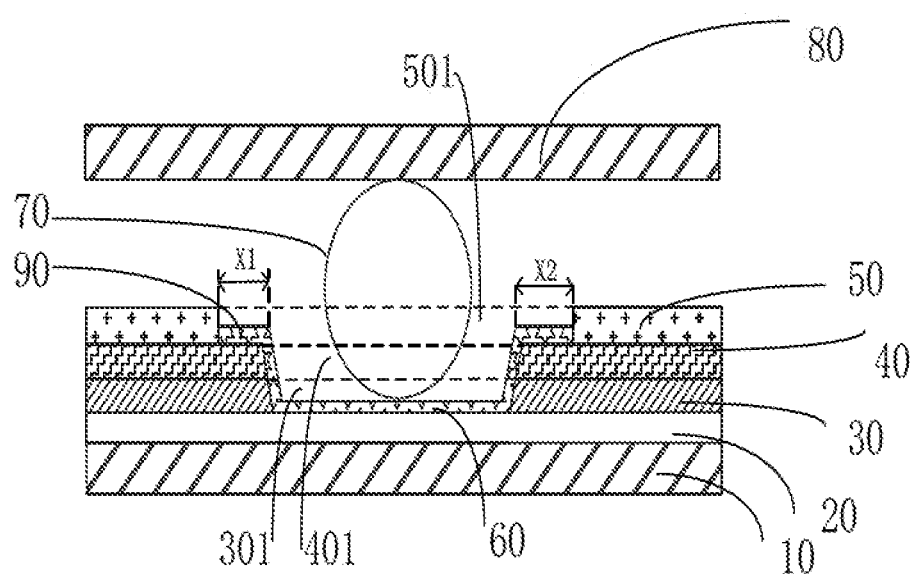
FIG. 5 is a schematic view (1) of the structure of a display panel according to an embodiment of this application.
Figure 6:
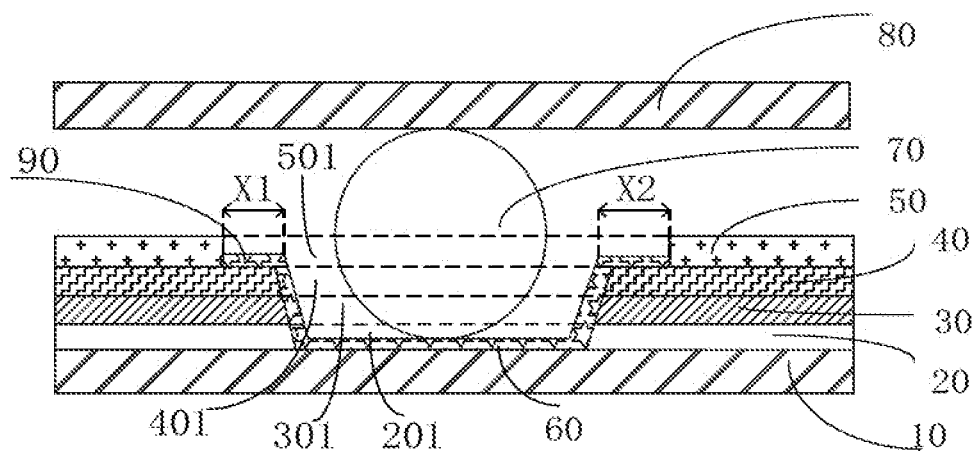
FIG. 6 is a schematic view (2) of the structure of a display panel according to an embodiment of this application.

As another embodiment of this application, with reference to FIG. 5 and FIG. 6, a display panel 2 is disclosed, including:

a first substrate;

a second substrate 80, arranged opposite to the first substrate, where the first substrate includes a common line, and the second substrate 80 includes a common electrode; and an Au ball 70, arranged in a non-display area 200 of the display panel 2, and conducting the common line of the first substrate and the common electrode of the second substrate 80, the Au ball 70 being positioned at a transfer pad 202, where the first substrate includes:

a substrate 10;

a first metal layer 20, arranged on the substrate;

a gate insulating layer 30, arranged on a first surface of the first metal layer 20, and hollowed out corresponding to the transfer pad 202 to form a gate insulating recessed region 301;

a second metal layer 40, arranged on a first surface of the gate insulating layer 30, a portion of the second metal layer 40 corresponding to the gate insulating recessed region 301 being hollowed out to form a second metal recessed region 401;

a passivation layer 50, arranged on a first surface of the second metal layer 40, a portion of the passivation layer 50 corresponding to the gate insulating recessed region 301 being hollowed out to form a passivation recessed region 501, the width of the passivation recessed region 501 being greater than the width of the second metal recessed region 40, and an exposed surface of the second metal layer 40 being a second metal transfer pad 90; and a transparent electrode layer 60, covering the second metal transfer pad 90, the transparent electrode layer 60 being in communication with the common line of the first substrate, where the Au ball 70 is arranged at a position of the transparent electrode layer 60 corresponding to the second metal recessed region 401, and communicates the transparent electrode layer 60 of the first substrate with the common electrode of the second substrate 80.

In an LCD of the vertical alignment (VA) technology, liquid crystals are rotated by a vertical electric field loaded and formed between the first substrate and the second substrate 80, so that the liquid crystals form different deflection angles, and thereby, the upper polarizer can transmit light of different intensities. During the electric field loading process, in order to make the common line on the first substrate and the common electrode of the second substrate 80 conductive to each other, a conductive transfer pad 202 needs to be arranged in the sealant of the first substrate, so that the Au ball 70 contacts the upper and lower substrates; and at the position where no Au ball 70 is arranged, it is possible not to arrange the transfer pad 202. In the transfer pad 202 of the first substrate, the transparent electrode layer 60 in communication with the common line is laid; and in the position where the transfer pad 202 is not arranged, the common line can be hollowed out to form a mesh to facilitate light curing on the sealant. In such the solution, after cell alignment, when the Au ball 70 and the sealant are coated, if the Au ball 70 is pressed to protrude from the transfer pad 202, the upper and lower substrates are not well-conducted, or the thickness of the cell is abnormal, causing display abnormality. In this solution, the transparent electrode layer 60 covers the second metal transfer pad 90, the transparent electrode layer 60 is in communication with the common line through the second metal transfer pad 90, and the Au ball 70 is arranged on the first surface of the transparent electrode layer 60, so that the Au ball 70 communicates the transparent electrode layer 60 of the first substrate with the common electrode of the second substrate 80, to finally implement the mutual conduction between the common line of the first substrate and the common electrode of the second substrate 80. In this way, since the second metal transfer pad 90 increases the overall width of the transfer pad 202, the coated sealant can be prevented from overflowing from the transfer pad 202, thereby improving the display quality.

In an embodiment, with reference to FIG. 5, the transparent electrode layer 60 covers the second metal transfer pad 90, and meanwhile, covers the surface of the first metal layer 20, and side walls of sides of the gate insulating layer 30 and the second metal layer 40 corresponding to the second metal recessed region 401.

In this solution, the formed transparent electrode layer 60 covers the surface of the first surface of the first metal layer 20 corresponding to the transfer pad 202, and the transparent electrode layer 60 is in direct contact with the first metal layer 20, so the conductivity is high.

In an embodiment, with reference to FIG. 6, the first metal recessed region 201 is located at a hollowed portion of the first metal layer 20 corresponding to the transfer pad 202; and the transparent electrode layer 60 covers the first metal recessed region 201, side walls of sides of the gate insulating layer 30 and the second metal layer 40 corresponding to the second metal recessed region 401, and the second metal transfer pad 90.

In this solution, the portion of the first metal layer 20 corresponding to the transfer pad 202 is partially etched off to form the first metal recessed region 201, the formed transparent electrode layer 60 covers the first metal recessed region 201, and meanwhile, covers the side walls of the gate insulating layer 30 and the second metal layer 40 corresponding to the second metal recessed region 401, and the second metal transfer pad 90, and thus, the depth of the transfer pad 202 is increased, so that the coated sealant can be prevented from overflowing from the transfer pad 202, thereby improving the display quality.

The thickness of the first metal layer 20 generally ranges from 1500 to 8000 angstroms (Å), or from 2000 to 8000 Å.

The width of the second metal transfer pad 90 adjacent to the first connection region 201 is X1, and the range of X1 is generally 5 μm≤X1≤500 μm or 10 μm≤X1≤500 μm; and the width of the second metal transfer pad 90 adjacent to the second connection region 203 is X2, and the range of X2 is generally 5 μm≤X2≤500 μm or 10 μm≤X2≤500 μm.

Figures 7, 8:
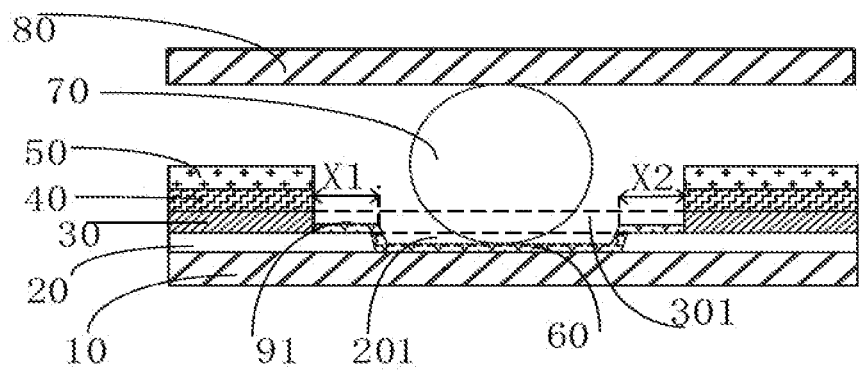
FIG. 7 is a schematic view (3) of the structure of a display panel according to an embodiment of this application.
FIG. 8 is a structural schematic view of a display device according to an embodiment of this application.

As an embodiment of this application, with reference to FIG. 7, a display panel 2 is disclosed, including:

an array substrate;

a color filter substrate, the array substrate being arranged opposite to the color filter substrate, where the array substrate includes a common line, and the color filter substrate includes a common electrode; and an Au ball 70, arranged in a non-display area 200 of the display panel 2, and conducting the common line of the array substrate and the common electrode of the color filter substrate 80, the Au ball 70 being positioned at a transfer pad 202, where the array substrate includes:

a substrate 10;

a first metal layer 20, arranged on the substrate, the first metal layer 20 being hollowed out corresponding to the transfer pad 202 to form a first metal recessed region 201;

a gate insulating layer 30, arranged on a first surface of the first metal layer 20, and hollowed out corresponding to the first metal recessed region 201 to form a gate insulating recessed region 301, the width of the gate insulating recessed region 301 being greater than the width of the first metal recessed region 201, and an exposed surface of the first metal layer being a first metal transfer pad 91;

a second metal layer 40, arranged on a first surface of the gate insulating layer 30, a portion of the second metal layer 40 corresponding to the gate insulating recessed region 301 being hollowed out to form a second metal recessed region 401;

a passivation layer 50, arranged on a first surface of the second metal layer 40, a portion of the passivation layer 50 corresponding to the second metal recessed region 401 being hollowed out to form a passivation recessed region 501; and a transparent electrode layer 60, covering the first metal recessed region 201 and the first metal transfer pad 91, the transparent electrode layer 60 being in communication with the common line of the array substrate, where the Au ball 70 is arranged at a position of the transparent electrode layer 60 corresponding to the first metal recessed region 201, and communicates the transparent electrode layer 60 of the first substrate with the common electrode of the second substrate 80.

In this solution, when manufacturing the array substrate, the substrate is covered with the metal material layer, the portion of the metal material layer corresponding to the transfer pad 202 is etched off to form the first metal recessed region 201, the transparent electrode layer 60 is formed on the first surface of the first metal recessed region 201, the transparent electrode layer 60 is electrically connected to the common line, the Au ball 70 is arranged on the first surface of the transparent electrode layer 60, the Au ball 70 communicates the common line of the array substrate with the common electrode of the color filter substrate, and the first metal recessed region 201 increases the depth of the transfer pad 202, so that the coated Au ball 70 and sealant can be prevented from overflowing from the transfer pad 202, thereby improving the display quality.

As another embodiment of this application, with reference to FIG. 8, a display device 1 is disclosed, including the foregoing display panel 2.

The panel of this application may be a twisted nematic (TN) panel, an in-plane switching (IPS) panel, or a multi-domain vertical alignment (VA) panel, and may certainly be any other suitable type of panel.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel manufacturing process, comprising the steps of:
    covering a substrate with a metal material layer to form a first metal layer located in a non-display area and a common line located in a display area;
    forming a gate insulating layer on a first surface of the first metal layer, and etching off a portion of the gate insulating layer corresponding to a transfer pad to form a gate insulating recessed region;
    forming a second metal layer on a first surface of the gate insulating layer, and etching off a portion of the second metal layer corresponding to the gate insulating recessed region to form a second metal recessed region;
    forming a passivation layer on a first surface of the second metal layer, and etching off a portion of the passivation layer corresponding to the transfer pad to form a passivation recessed region, the width of the passivation recessed region being greater than the width of the second metal recessed region, and an exposed surface of the second metal layer being a second metal transfer pad;
    forming a transparent electrode layer on the first surface of the second metal layer such that the transparent electrode layer covers the second metal transfer pad and the transparent electrode layer is in communication with the common line through the second metal transfer pad, to form a first substrate;
    forming a second substrate provided with a common electrode; and
    arranging an Au ball on a first surface of the transparent electrode layer, and enabling the Au ball to communicate the transparent electrode layer of the first substrate with the common electrode of the second substrate.

2. The display panel manufacturing process according to claim 1, wherein the step of forming a transparent electrode layer on the first surface of the second metal layer such that the transparent electrode layer covers the second metal transfer pad and the transparent electrode layer is in communication with the common line through the second metal transfer pad comprises:
    covering the surface of the first surface of the first metal layer corresponding to the transfer pad, side walls of the gate insulating layer and the second metal layer corresponding to the second metal recessed region, and the second metal transfer pad with the formed transparent electrode layer.

3. The display panel manufacturing process according to claim 1, wherein the step of forming a transparent electrode layer on the first surface of the second metal layer such that the transparent electrode layer covers the second metal transfer pad and the transparent electrode layer is in communication with the common line through the second metal transfer pad comprises:
    partially etching off a portion of the first metal layer corresponding to the transfer pad to form a first metal recessed region; and
    covering the first metal recessed region, side walls of the gate insulating layer and the second metal layer corresponding to the second metal recessed region, and the second metal transfer pad with the formed transparent electrode layer.

4. The display panel manufacturing process according to claim 1, wherein the first metal layer and the common line of the first substrate are formed by the same manufacturing process and are electrically connected to each other.

5. The display panel manufacturing process according to claim 1, wherein the second metal layer and the common line of the first substrate are formed by the same manufacturing process and are electrically connected to each other.

6. The display panel manufacturing process according to claim 1, wherein the common line of the first substrate and the first metal layer or the second metal layer are made through a same mask, and the first metal layer and the second metal layer are electrically connected through a via hole.

7. A display panel, comprising:
    a first substrate;
    a second substrate, arranged opposite to the first substrate, wherein
    the first substrate comprises a common line, and the second substrate comprises a common electrode; and
    an Au ball, arranged in a non-display area of the display panel, and conducting the common line of the first substrate and the common electrode of the second substrate, the Au ball being positioned at a transfer pad, wherein
    the first substrate comprises:
    a substrate;
    a first metal layer, arranged on the substrate;
    a gate insulating layer, arranged on a first surface of the first metal layer, and hollowed out corresponding to the transfer pad to form a gate insulating recessed region;
    a second metal layer, arranged on a first surface of the gate insulating layer, a portion of the second metal layer corresponding to the gate insulating recessed region being hollowed out to form a second metal recessed region;
    a passivation layer, arranged on a first surface of the second metal layer, a portion of the passivation layer corresponding to the gate insulating recessed region being hollowed out to form a passivation recessed region, the width of the passivation recessed region being greater than the width of the second metal recessed region, and an exposed surface of the second metal layer being a second metal transfer pad; and
    a transparent electrode layer, covering the second metal transfer pad, the transparent electrode layer being in communication with the common line of the first substrate, wherein
    the Au ball is arranged at a position of the transparent electrode layer corresponding to the second metal recessed region, and communicates the transparent electrode layer of the first substrate with the common electrode of the second substrate.

8. The display panel according to claim 7, wherein the transparent electrode layer covers the second metal transfer pad, and meanwhile, covers the surface of the first metal layer, and side walls of sides of the gate insulating layer and the second metal layer corresponding to the second metal recessed region.

9. The display panel according to claim 7, wherein the first metal recessed region is located at a hollowed portion of the first metal layer corresponding to the transfer pad; and the transparent electrode layer covers the first metal recessed region, side walls of sides of the gate insulating layer and the second metal layer corresponding to the second metal recessed region, and the second metal transfer pad.

10. The display panel according to claim 7, wherein the first metal layer and the common line of the first substrate are formed by the same manufacturing process and are electrically connected to each other.

11. The display panel according to claim 7, wherein the second metal layer and the common line of the first substrate are formed by the same manufacturing process and are electrically connected to each other.

12. The display panel according to claim 7, wherein the common line of the first substrate and the first metal layer or the second metal layer are made through a same mask, and the first metal layer and the second metal layer are electrically connected through a via hole.

13. The display panel according to claim 7, wherein the first substrate is an array substrate, and the second substrate is a color filter substrate.

14. A display device, the display device comprising a display panel, wherein
the display panel comprises a first substrate;
a second substrate, arranged opposite to the first substrate, wherein
the first substrate comprises a common line, and the second substrate comprises a common electrode; and
an Au ball, arranged in a non-display area of the display panel, and conducting the common line of the first substrate and the common electrode of the second substrate, the Au ball being positioned at a transfer pad, wherein
the first substrate comprises:
a substrate;
a first metal layer, arranged on the substrate;
a gate insulating layer, arranged on a first surface of the first metal layer, and hollowed out corresponding to the transfer pad to form a gate insulating recessed region;
a second metal layer, arranged on a first surface of the gate insulating layer, a portion of the second metal layer corresponding to the gate insulating recessed region being hollowed out to form a second metal recessed region;
a passivation layer, arranged on a first surface of the second metal layer, a portion of the passivation layer corresponding to the gate insulating recessed region being hollowed out to form a passivation recessed region, the width of the passivation recessed region being greater than the width of the second metal recessed region, and an exposed surface of the second metal layer being a second metal transfer pad; and
a transparent electrode layer, covering the second metal transfer pad, the transparent electrode layer being in communication with the common line of the first substrate, wherein
the Au ball is arranged at a position of the transparent electrode layer corresponding to the second metal recessed region, and communicates the transparent electrode layer of the first substrate with the common electrode of the second substrate.

15. The display device according to claim 14, wherein the transparent electrode layer covers the second metal transfer pad, and meanwhile, covers the surface of the first metal layer, and side walls of sides of the gate insulating layer and the second metal layer corresponding to the second metal recessed region.

16. The display device according to claim 14, wherein the first metal recessed region is located at a hollowed portion of the first metal layer corresponding to the transfer pad; and the transparent electrode layer covers the first metal recessed region, side walls of sides of the gate insulating layer and the second metal layer corresponding to the second metal recessed region, and the second metal transfer pad.

17. The display device according to claim 14, wherein the first metal layer and the common line of the first substrate are formed by the same manufacturing process and are electrically connected to each other.

18. The display device according to claim 14, wherein the second metal layer and the common line of the first substrate are formed by the same manufacturing process and are electrically connected to each other.

19. The display device according to claim 14, wherein the common line of the first substrate and the first metal layer or the second metal layer are made through a same mask, and the first metal layer and the second metal layer are electrically connected through a via hole.

* * * * *